United States Patent

Igari et al.

[11] Patent Number: 5,979,626
[45] Date of Patent: Nov. 9, 1999

[54] ONE-WAY CLUTCH

[75] Inventors: Kozaburo Igari; Yoshio Kinoshita; Yasuhide Takasu, all of Shizuoka-ken, Japan

[73] Assignee: NSK-Warner K.K., Tokyo, Japan

[21] Appl. No.: 08/879,333

[22] Filed: Jun. 20, 1997

[30] Foreign Application Priority Data

Jun. 21, 1996 [JP] Japan .................................... 8-179779

[51] Int. Cl.[6] .................................................. F16D 41/07
[52] U.S. Cl. ........................................ 192/45.1; 192/41 A
[58] Field of Search ............................ 192/45.1, 41 A; 384/572, 575; 411/516–519; 403/372, 365, 367

[56] References Cited

U.S. PATENT DOCUMENTS

| 5,024,308 | 6/1991 | Kinoshita et al. | 192/45.1 X |
| 5,038,903 | 8/1991 | Akagi et al. | 192/45.1 X |
| 5,070,976 | 12/1991 | Zlotek | 192/45.1 |
| 5,526,911 | 6/1996 | Kinoshita | 192/45.1 |
| 5,577,586 | 11/1996 | Buckendahl | 192/45.1 |

FOREIGN PATENT DOCUMENTS

| 59-166729 | 9/1984 | Japan | 192/45.1 |
| 63-130932 | 6/1988 | Japan | 192/45 |

Primary Examiner—Tamara L. Graysay
Assistant Examiner—William C. Joyce
Attorney, Agent, or Firm—Vorys, Sater, Seymour and Pease LLP

[57] ABSTRACT

A one-way clutch designed to achieve a reduction in the number of parts and a simplification of assembly. The one-way clutch includes a retainer having a holding hole formed in a portion interposed between an outer race and an inner race to hold a sprag biting between the outer race. The retainer is provided with an elliptical flange urged against the inner periphery of a counterbore formed in the side of the outer race. Since the retainer holds the sprag with the holding hole, the structure of the one-way clutch is simplified. When the flange is pushed into the counterbore of the outer race, the portion of the major diameter of the flange presses the inner periphery of the counterbore, whereby the retainer is made integral with the outer race.

13 Claims, 4 Drawing Sheets

ONE-WAY CLUTCH

BACKGROUND OF THE INVENTION

1. Field of the Invention

This invention belongs to the technical field of a one-way clutch incorporated, for example, between the drive shaft and the driven shaft of an automobile, an ordinary industrial machine or the like for transmitting the power in only one rotational direction of the drive shaft to the driven shaft.

2. Related Background Art

Conventionally, a one-way clutch, as shown in FIGS. 5 to 7 of the accompanying drawings, is provided with a sprag 23 biting between an outer race 21 and an inner race 22, an annular wire cage 24 holding this sprag 23, a ring-like spring 26 engaged with a spring engagement groove 25 formed in the sprag 23 and holding the sprag 23 between itself and the wire cage 24, and two ring-like side plates 27 and 28 holding the sprag 23 therebetween on the axial opposite sides thereof.

The wire cage 24 is formed with a wire bent so that opening portions may alternately face the axial opposite sides of the outer race 21 and the inner race 22. A plurality of projected pieces 29 are inwardly and projectedly provided on the inner peripheries of the side plates 27 and 28. These projected pieces 29 are engaged with the wire cage 24, whereby the side plates 27 and 28 are incorporated into the wire cage 24.

A plurality of radially protruding resilient projected pieces 30, 31 are formed on the outer periphery of the side plate 27. When these resilient projected pieces 30, 31 are inserted into a groove 33 formed in the side of the outer race coaxially with the outer race, the wire cage 24 is positioned relative to the outer race 21 by the resilient forces of the bent resilient projected pieces 30, 31.

The one-way clutch 20 suffers from the following problems:

(1) The number of parts is great and much time and labor are required for assembling.

(2) The bent resilient projected pieces 30, 31 must be formed.

SUMMARY OF THE INVENTION

The present invention solves the above-noted problems by a one-way clutch provided with a ring-like retainer intervening between the outer race and the inner race and holding a sprag biting between an outer race and an inner race in a holding hole, the retainer being provided with an elliptical flange urged against the inner periphery of a counterbore formed in the side of the outer race coaxially therewith.

The retainer holds the sprag with a holding hole, is incorporated between the outer race and the inner race, and serves to perform the function of the conventional wire cage and side plates.

When the flange is pushed into the counterbore formed in the side of the outer race, the portion of the major diameter of the flange comes into pressure contact with the inner periphery of the counterbore, and the retainer and the outer race are thus made integral with each other.

According to a first mode of the one-way clutch of the present invention, the following effects can be achieved:

(1) Since the retainer holds the sprag with the holding hole, is incorporated between the outer race and the inner race, and serves to perform the function of a conventional wire cage and two side plates, the number of parts of the one-way clutch can be decreased.

(2) By decreasing the number of parts, the structure and assembly of the one-way clutch can be simplified.

(3) When the flange is pushed into the counterbore formed in the side of the outer race, the portion of the major diameter of the flange comes into pressure contact with the inner periphery of the counterbore and therefore, the retainer and the outer race can be reliably made integral with each other by a simple structure.

(4) Since the flange is made into an elliptical shape, the conventional bent resilient projected pieces become unnecessary and the shapes of the parts can be simplified.

According to a second mode of the one-way clutch of the present invention, the following effects can be further achieved. If the flange is provided with a radially outwardly opening cut-away, the flange can be given enhanced resiliency and the retainer and the outer race can be more reliably made integral with each other.

The cut-away can be used as a hole for removing any dust or the like created when or after the one-way clutch is incorporated between a drive shaft and a driven shaft, and can also be used as an oil pouring hole. Accordingly, the maintenance of the one-way clutch becomes easy.

DESCRIPTION OF THE PREFERRED EMBODIMENT

Figure 1:
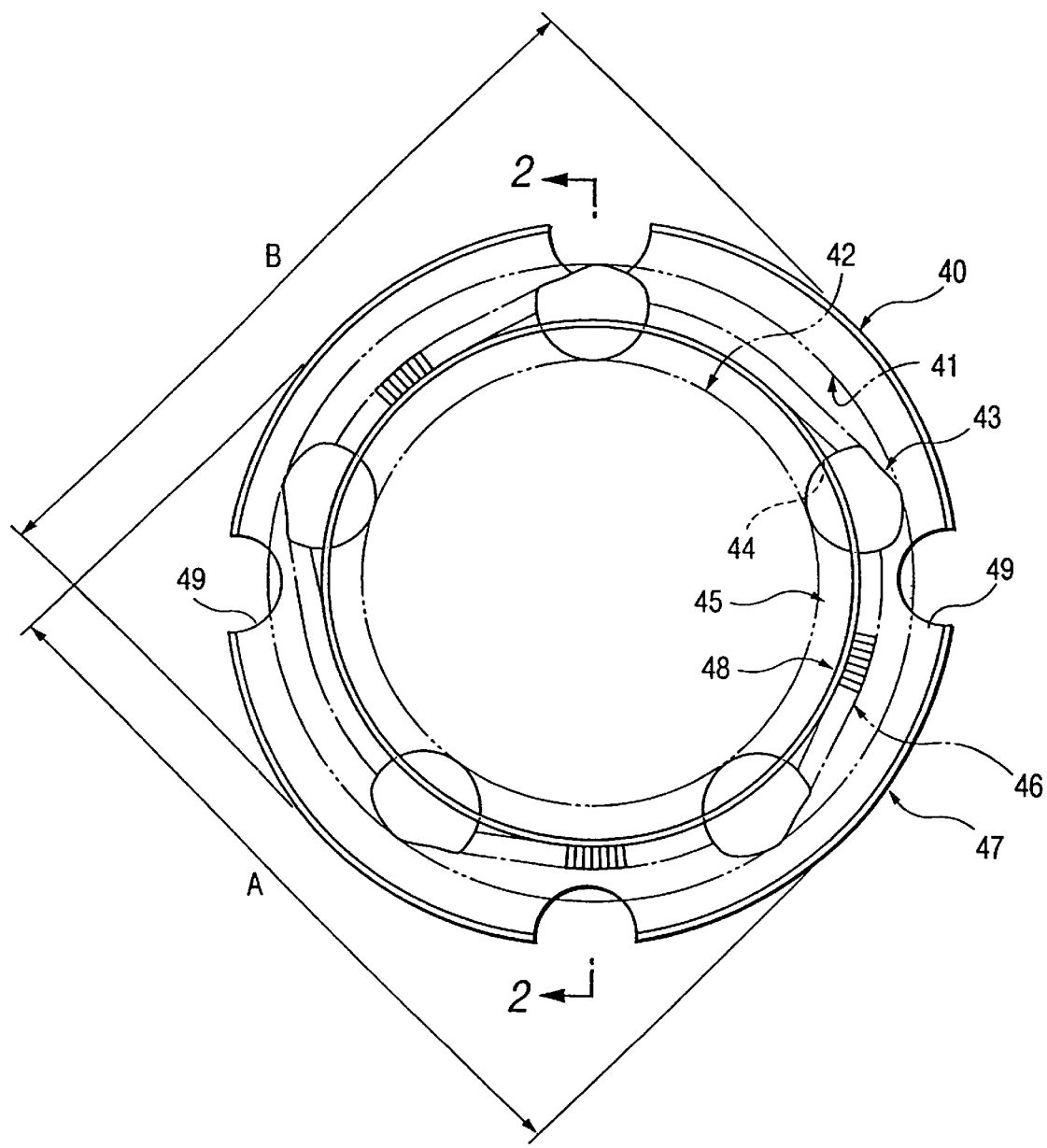
FIG. 1 is a schematic front view of a one-way clutch according to an embodiment of the present invention.

An embodiment of the present invention will hereinafter be described with reference to FIGS. 1 to 4. In FIG. 1, a one-way clutch 40 is provided with an outer race 41, an inner race 42, a ring-like sprag 43 biting between the outer race 41 and the inner race 42, a retainer 45 formed with a holding hole 44 for holding the sprag 43, and a ring-like coil spring 46 for holding down the sprag 43 in the holding hole 44.

Figure 2:
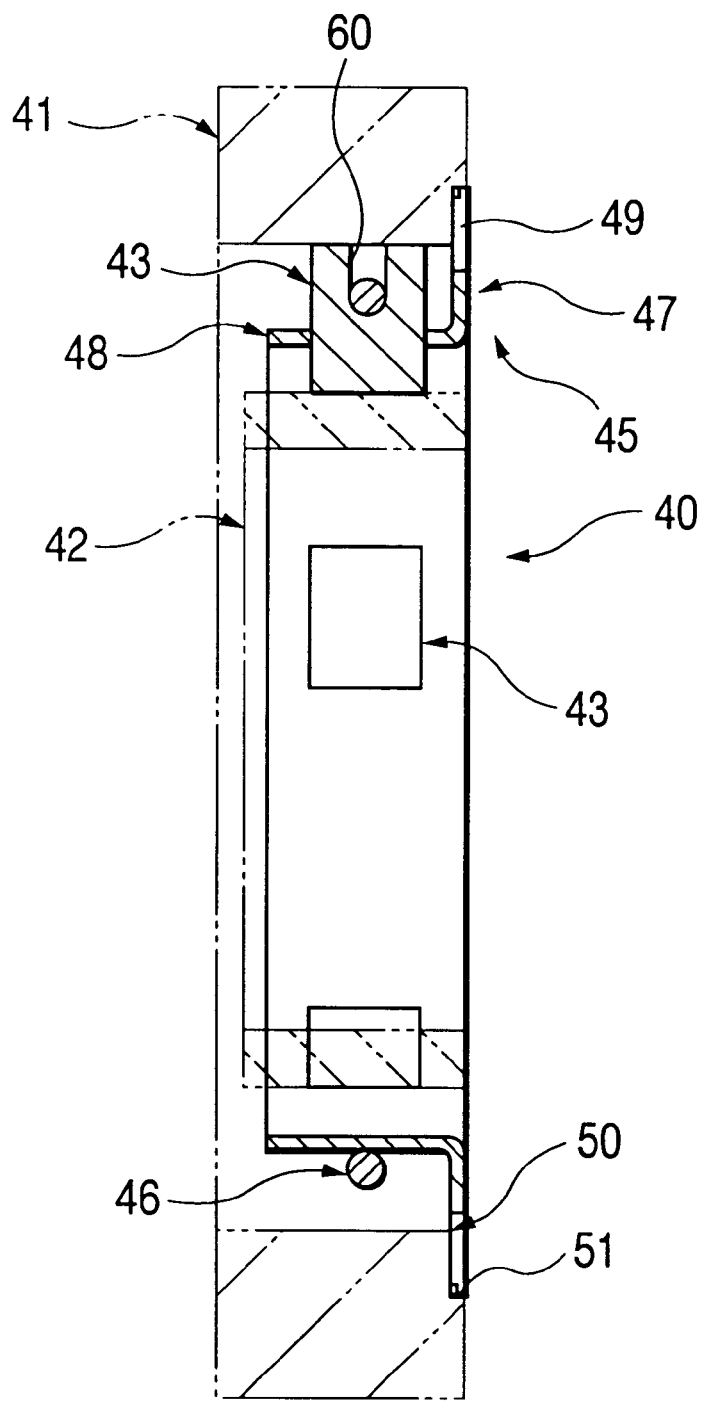
FIG. 2 is a cross-sectional view taken along the line 2—2 of FIG. 1.
Figure 3:
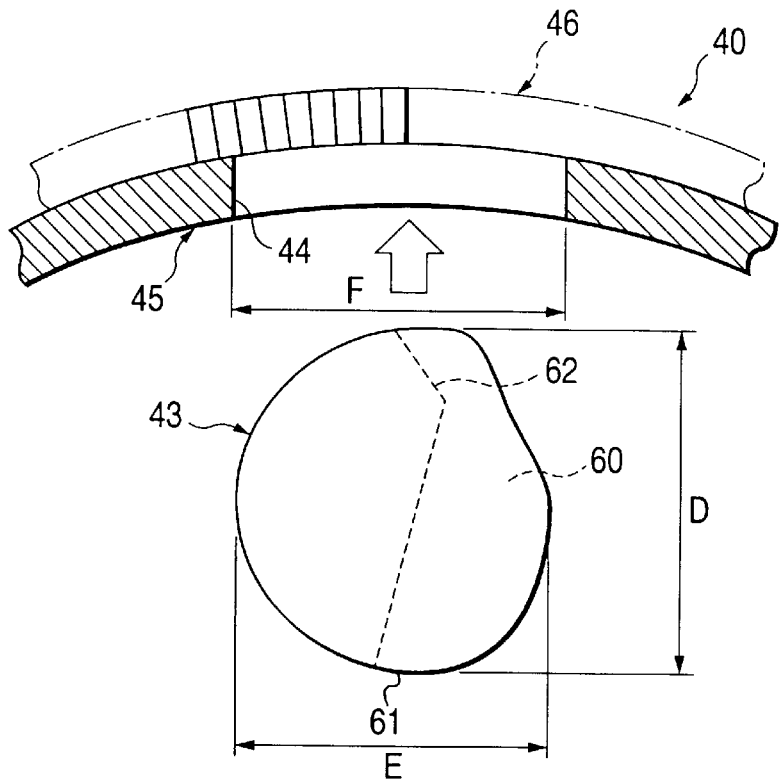
FIG. 3 illustrates the manner in which a sprag is incorporated into a retainer.

In FIG. 2, a counterbore 50 coaxial with the outer race 41 is formed in the side of the outer race 41.

The sprag 43 is formed with a spring receiving groove 60 engaged by the coil spring 46. The bottom of the spring receiving groove 60 is formed into the shape of a mountain (see FIG. 3).

The retainer 45 is made of a thin iron plate, and is comprised of a flange 47 and a cylinder portion 48. The cylinder portion 48 is formed with the holding hole 44.

The flange 47 is formed into an elliptical shape of which the minor diameter A is smaller than the major diameter B. The flange 47 is formed with four semicircular cut-aways 49 opening radially outwardly of the flange 47 at equal intervals.

The above-described four cut-aways are merely illustrative, and of course, the number thereof may be one, or a plurality of cut-aways may be formed at unequal intervals.

Description will now be made of an example of the order of assembly of the one-way clutch.

First, the sprag 43 is mounted on the retainer 45 having the spring 46 mounted in advance thereon.

To mount the sprag 43 on the retainer 45, the sprag 43 is inserted from the inside of the retainer 45 into the holding hole 44 with the bottom of the spring receiving groove 60 (see FIG. 3) made substantially parallel to the diametral direction of the retainer 45. Thereafter, the arcuate portion 61 is supported by a tool or a fingertip. The short inclined surface 62 of the bottom of the spring receiving groove 60 is pushed by the spring 46 and therefore, the sprag 43 is rotated in the direction of arrow C in FIG. 4 and settles down in the holding hole 44.

Figure 4:
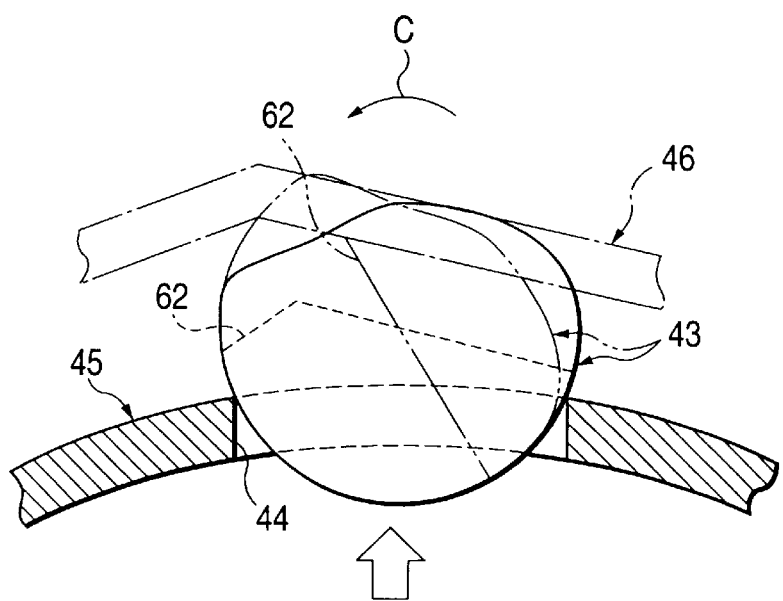
FIG. 4 illustrates the manner in which the sprag is incorporated into the retainer.
Figure 5:
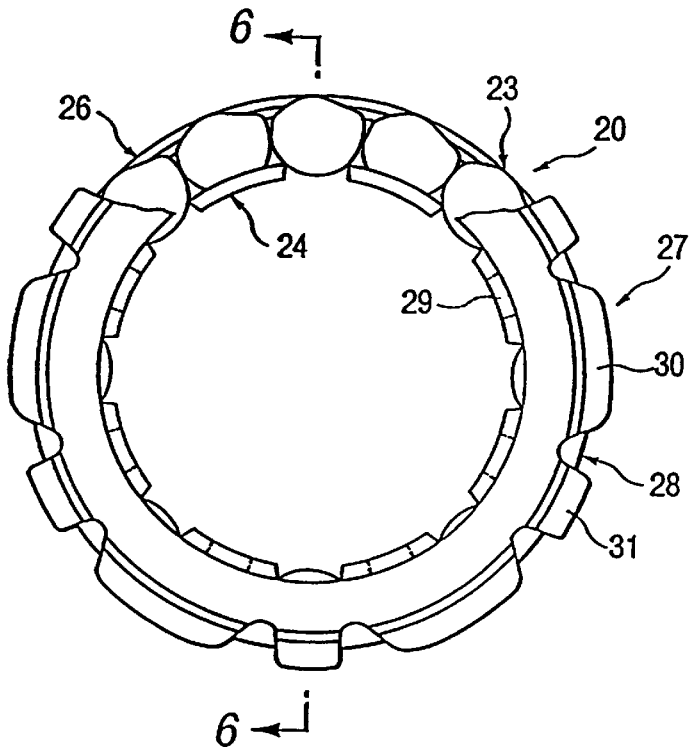
FIG. 5 is a front view of a one-way clutch according to the conventional art.
Figure 6:
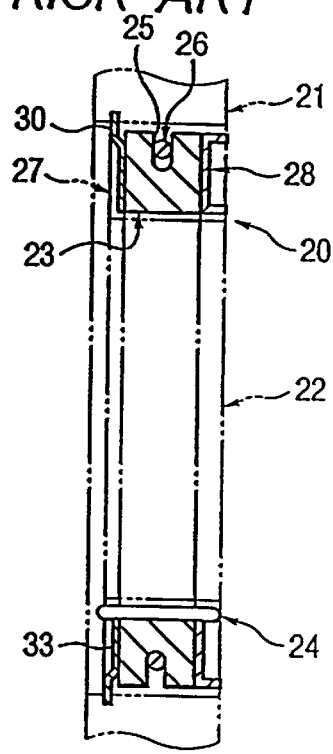
FIG. 6 is a cross-sectional view taken along the line 6—6 of FIG. 5.
Figure 7:
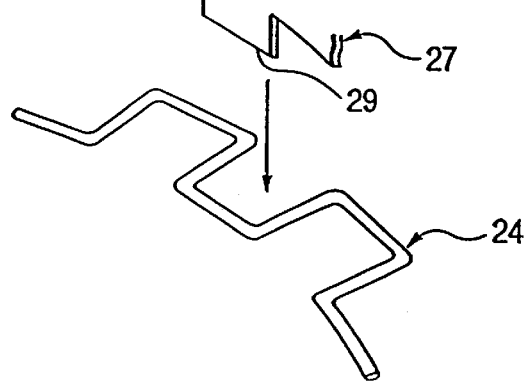
FIG. 7 is a fragmentary perspective view of the wire cage and one side plate of the one-way clutch of FIG. 5.

In FIG. 4, the dimensional relation among the diameter D of the sprag 43 in a direction along the bottom of the spring receiving groove 60, the diameter E of the sprag 43 in a direction intersecting the spring receiving groove 60 and the length F of an opening in the holding hole 44 in the circumferential direction of the retainer 45 is D>F>E.

The sprag 43 mounted on the retainer 45 is prevented from escaping by the spring 46. The retainer 45 having a plurality of sprags 43 mounted thereon is handled as a single part during the assembly of the one-way clutch 40.

Thereafter, the inner race 42 and the outer race 41 are incorporated so that the former may be positioned inside the retainer 45 and the latter may be positioned outside the retainer 45, whereby the incorporation of the one-way clutch 40 is completed.

When the flange 47 is pushed into the counterbore 50 when the outer race 41 disposed outside the retainer 45, the flange 47 presses the inner periphery of the counterbore 50 by the portion of the major diameter B and makes the retainer 45 integral with the outer race 41.

The flange 47 is designed such that an enhanced resilient repulsive force is created due to the presence of the cut-away 49, whereby the inner periphery 51 of the counterbore 50 is pressed.

Even if the cut-away 49 is not formed, when the portion of the major diameter B is pushed into the counterbore, a resilient repulsive force is created in the flange 47 to a certain extent. Therefore, the cutaway 49 is not always required.

The cut-away 49 can be used as a hole for removing any dust or the like created when or after the one-way clutch 40 is incorporated between a drive shaft and a driven shaft (not shown), and can also be used as an oil pouring hole.

When, in FIG. 4, a rotational force in the direction of arrow C is applied to the sprag 43 after the one-way clutch 40 has been incorporated between the drive shaft and the driven shaft, the sprag 43 bites between the outer race 41 and the inner race 42 and transmits the rotational force of the drive shaft to the driven shaft. When a rotational force in the direction opposite to the direction of arrow C is applied to the sprag 43, the sprag 43 does not bite between the outer race 41 and the inner race 42 and the transmission of the rotational force between the drive shaft and the driven shaft does not take place.

What is claimed is:

1. A one-way clutch comprising a ring-shaped retainer having a holding hole which is formed in an annular plate portion intervening between an outer race and an inner race and which holds a sprag biting between said outer race and said inner race, said retainer further having an elliptical flange urged against an inner periphery of a counterbore formed in a side of said outer race coaxially with said outer race.

2. The one-way clutch of claim 1, wherein said flange is provided with a radially outwardly opening cut-away.

3. The one-way clutch of claim 1, wherein said retainer is formed as a single piece.

4. The one-way clutch of claim 1, wherein said flange abuts an axial end face of said counterbore.

5. The one-way clutch of claim 1, wherein said sprag is held in said holding hole by an annular spring disposed between said inner and outer races and having a portion received in a groove formed in said sprag.

6. A one-way clutch comprising a ring-shaped retainer having a holding hole which is formed in an annular plate portion intervening between an outer race and an inner race and which holds a sprag biting between said outer race and said inner race, said retainer being provided with an elliptical flange resiliently engaged with an inner periphery of a recess portion formed in said outer race.

7. The one-way clutch of claim 6, wherein said flange is provided with a radially outwardly opening cutaway.

8. The one-way clutch of claim 6, wherein said retainer is formed as single piece.

9. The one-way clutch of claim 6, wherein said recess portion is a counterbore formed in a side of said outer race coaxially with said outer race.

10. The one-way clutch of claim 9, wherein said retainer is formed as a single piece.

11. The one-way clutch of claim 10, wherein said flange abuts an axial end face of said counterbore.

12. The one-way clutch of claim 6, wherein said flange abuts an axial end face of said recess portion.

13. The one-way clutch of claim 6, wherein said sprag is held in said holding hole by an annular spring disposed between said inner and outer races and having a portion received in a groove formed in said sprag.

* * * * *